United States Patent [19]

Gautier et al.

[11] Patent Number: 4,748,166

[45] Date of Patent: May 31, 1988

[54] RTV STORAGE STABLE, WATER-FREE ORGANOPOLYSILOXANES

[75] Inventors: Alain Gautier, Lyons; Bernard Laisney; Michel Letoffe, both of Ste Foy-Lès-Lyon, all of France

[73] Assignee: Rhone-Poulenc Industries, Paris, France

[21] Appl. No.: 869,859

[22] Filed: May 28, 1986

Related U.S. Application Data

[63] Continuation of Ser. No. 767,258, Aug. 21, 1985, abandoned, which is a continuation of Ser. No. 676,216, Nov. 29, 1984, abandoned, which is a continuation of Ser. No. 517,414, Jul. 26, 1983, abandoned, which is a continuation of Ser. No. 377,156, May 11, 1982, abandoned, which is a continuation of Ser. No. 157,855, Jun. 9, 1980, abandoned.

[30] Foreign Application Priority Data

Jun. 8, 1979 [FR] France ................................ 79 14675

[51] Int. Cl.$^4$ .............................................. C08K 11/00
[52] U.S. Cl. ......................... 524/13; 524/16; 524/493; 524/497; 524/445; 524/448; 524/89; 524/262; 524/188; 524/186; 524/31; 524/437; 524/436; 524/431; 524/486; 524/432; 524/433; 524/435; 524/404; 524/425; 524/702; 524/703; 524/730; 524/785; 524/786; 524/780; 524/789; 524/796; 524/588; 524/847; 528/15; 528/17; 528/18; 528/21; 528/22; 528/23; 528/34; 525/104; 525/106
[58] Field of Search ............... 524/860, 493, 497, 445, 524/448, 89, 262, 188, 186, 13, 16, 437, 436, 431, 486, 432, 433, 435, 404, 425, 702, 703, 730, 785, 786, 780, 789, 796, 588, 847; 528/15, 17, 18, 21, 22, 33, 34; 525/104, 106

[56] References Cited

U.S. PATENT DOCUMENTS

| | | | |
|---|---|---|---|
| 3,161,614 | 12/1964 | Brown et al. | 260/46.5 |
| 3,170,894 | 2/1965 | Brown et al. | 260/46.5 |
| 3,294,739 | 12/1966 | Weyenberg | 260/46.5 |
| 3,350,349 | 10/1967 | Hyde | 528/34 |
| 3,560,442 | 2/1971 | Golitz | 260/46.5 |
| 3,671,485 | 6/1972 | Marwitz et al. | 524/284 |
| 3,686,357 | 8/1972 | Cheeseman | 260/46.5 |
| 3,888,815 | 6/1975 | Bessmer et al. | 528/15 |
| 3,933,729 | 1/1976 | Letoffe | 524/588 |

FOREIGN PATENT DOCUMENTS

| | | |
|---|---|---|
| 828657 | 2/1960 | United Kingdom . |
| 972900 | 10/1964 | United Kingdom . |
| 1302411 | 1/1973 | United Kingdom . |
| 1306680 | 2/1973 | United Kingdom . |
| 1436694 | 5/1976 | United Kingdom . |

*Primary Examiner*—Melvyn I. Marquis
*Attorney, Agent, or Firm*—Burns, Doane, Swecker & Mathis

[57] ABSTRACT

Storage stable, water-free, RTV organopolysiloxane adhesives curable in the presence of water or atmospheric moisture, and comprising a dihydroxydiorganopolysiloxane polymer, fillers, an amine fraction and a curing catalyst, are characterized by incorporation therein of a polyalkoxylated organosilane having the formula:

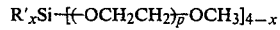

wherein R' is methyl, vinyl, allyl, methallyl or phenyl, and p and x are each one or two.

15 Claims, No Drawings

RTV STORAGE STABLE, WATER-FREE ORGANOPOLYSILOXANES this application is a continuation of Ser. No. 767,258, filed Aug. 21, 1985, now abandoned, which is a continuation of Ser. No. 676,216, filed Nov. 29, 1984, which is a continuation of Ser. No. 517, 414, filed July 26, 1983, which is a continuation of Ser. No. 377,156, filed May 11, 1982, which is a continuation of Ser. No. 157,855, filed June 9, 1980, all now abandoned.

BACKGROUND OF THE INVENTION

1. Field of the Invention:

The present invention relates to novel organopolysiloxane compositions which are storage stable, in the absence of water, and which harden or cure into elastomers, at or above ambient temperature, namely, within a range which is typically between about 5° C. and 35° C., in the presence of water.

These subject compositions are formulated by intimately admixing hydroxylated diorganopolysiloxane polymers, fillers, particular polyalkoxylated silanes, organic or organosilicon amino compounds and metal or organometallic salts of carboxylic acids.

2. Description of the Prior Art:

Silicone compositions prepared by admixing constituents somewhat similar to those noted above are well known to this art. Certain of such compositions are not stable on storage; they are thus referred to as two-component compositions because they must be packaged in two different packages, with, for example, the hydroxylated diorganopolysiloxane polymers, the fillers and the alkoxylated silanes in one of the packages and the amino compounds and the metal salts in the other package.

The aforesaid packaging in two individual packets is not very practical (especially for building or construction applications, which are very frequently carried out in the open air) because it is necessary to carefully mix the contents of one of the packets with the contents of the other packet only at the time of use, and to immediately use the entire amount of the resultant compositions.

Compositions of this type are more particularly described in British Patent No. 7,363,069 and U.S. Pat. Nos. 3,888,815 and 3,933,729

British Patent No. 7,363,069 features compositions prepared by mixing hydroxylated or alkoxylated diorganoysiloxanes, alkoxylated silanes (or polysiloxanes), linear aminoalkylpolysiloxanes having at least one aminoalkyl radical and at least one alkoxy radical, and hardening catalysts.

U.S. Pat. No. 3,888,815 describes compositions prepared by mixing hydroxylated diorganopolysiloxanes, alkoxylated silanes (or polysiloxanes), fillers, aminoorganosilanes containing hydrolyzable radicals, and hardening catalysts.

U.S. Pat. No. 3,933,729 describes compositions prepared by mixing hydroxylated diorganopolysiloxanes, methylpolysiloxane resins, fillers, alkoxylated aminoorganosilanes (or aminoorganopolysiloxanes) and, if appropriate, alkyl silicates or polysilicates.

Other silicone compositions, however, are stable on storage; these are referred to as one-component compositions and are packaged in a single packet.

Compositions of this latter type are described for example, in U.S. Pat. Nos. 3,161,614, 3,170,894 and 3,686,357 and published Japanese Application No. 53,102,956.

U.S. Pat. Nos. 3,161,614 and 3,170,894 describe compositions prepared by mixing diorganopolysiloxanes blocked or terminated at each end of the polymer chain by a polyalkoxy-siloxy unit, and hardening catalysts, such as organic or organosilicon amines. These compositions comprise poorly accessible diorganopolysiloxanes which are characteristically obtained by reacting chloroalkoxysilanes with hydroxylated diorganopolysiloxanes; moreover, same harden quite slowly in ambient air, thus necessitating, e.g., that any assemblies adhesively joined using these compositions must be stored in workshops for at least several days.

U.S. Pat. No. 3,686,357 describes compositions prepared by mixing diorganopolysiloxanes blocked at each end of their polymer chain by a polyalkoxysiloxy unit, linear aminoalkylpolysiloxanes also blocked at each end of their polymer chain by a polyalkoxysiloxy unit, and hardening catalysts. These compositions include two different kinds of polysiloxanes and the preparation of each kind requires a special step. Furthermore, the viscosity of such compositions tends to increase during storage, and any such increase in viscosity considerably hinders extrusion of the composition through the nozzles of the packet, e.g., tube, in which they are usually packaged.

Japanese Application No. 53/102,956 describes compositions prepared by mixing organopolysiloxanes each having at least two silicon atoms bonded to alkoxy groups, crosslinking systems produced by heating alkoxylated silanes (or polysiloxanes) with tin salts of carboxylic acids, and alkoxylated aminoorganosilanes. These compositions include, on the one hand, organopolysiloxanes which are much more difficult to obtain than the hydroxylated organopolysiloxanes, and, on the other hand, crosslinking systems which require a heating step for their preparation.

SUMMARY OF THE INVENTION

Accordingly, a major object of the present invention is the provision of one-component, curable silicone compositions prepared from readily available constiuents, which are remarkably storage stable in the absence of water, and harden, at or above ambient temperature and in the presence of water, to afford elastomers having good mechanical properties.

Briefly, the subject compositions are formulated by intimately admixing:

(A) 100 parts of $\alpha, \omega$-dihydroxydiorganopolysiloxane polymers having a viscosity of at least 500 mPa.s at 25° C. and comprising diorganosiloxy units of the formula $R_2SiO$, in which the symbols R, which are identical or different, represent alkyl and haloalkyl radicals having from 1 to 8 carbon atoms, cycloalkyl and halocycloalkyl radicals having from 4 to 8 carbon atoms, alkenyl radicals having from 2 to 4 carbon atoms, aryl and haloaryl radicals having from 6 to 8 carbon atoms or cyanoalkyl radicals having from 3 to 4 carbon atoms, at least 50% of the total of such radicals 0 being methyl radicals;

(B) 5 to 200parts of fillers;

(C) 2 to 20 parts of polyalkoxylated organosilanes;

(D) 0.5 to 15 parts of amino compounds selected from among the primary and secondary organic amines having a $pK_b$ of less than 5 in an aqueous medium and having a boiling point of at least 60° C. at atmospheric pressure, and the aminoorganosilanes corresponding to the general formula:

in which the symbol R" represents a methyl or ethyl radical, the symbol G represents an alkylene radical having from 1 to 5 carbon atoms, the symbol X represents an oxygen or sulfur atom, the symbol G' represents an alkylene radical having from 2 to 5 carbon atoms, the symbol Y' represents a radical of the formula (G"NH)$_k$R''', in which the symbol G" represents an alkylene radical having from 2 to 6 carbon atoms, the symbol R''' represents a hydrogen atom or an alkyl radical having from 1 to 4 carbon atoms and the symbol k represents zero, one, two or three, the symbol Y" represents a methyl, vinyl or phenyl radical, the symbols p and y represent zero or one (if p represents one, the symbol R" can only represent a methyl radical) and the symbol m represents zero, one, two or three; and (E) 0.005 to 3 parts of hardening or curing catalysts selected from among the iron chelates, tin, iron and lead salts of carboxylic acids, organotin salts of carboxylic acids, the products resulting from the reaction of such organotin salts with alkyl titanates, and the products resulting from the reaction of diorganotin chlorides with alkyl esters of thioglycolic acid, said compositions being characterized in that the organosilanes (C) have the formula R'$_x$Si$-$(OCH$_2$CH$_2$)$_p$OCH$_{3 4-x}$ in which the symbol R'represents a methyl, vinyl, allyl, methallyl or phenyl radical and the symbols p and x represent zero or one.

DETAILED DESCRIPTION OF THE INVENTION

More particularly according to this invention, the α, ω-dihydroxydiorganopolysiloxane polymers (A) have a viscosity of at least 500 mPa.s at 25° C. and preferably of at least 3,000 mPa.s at 25° C. Same include relatively non-viscous oils having a viscosity ranging from 500 mPa.s to 50,000 mPa.s at 25° C., viscous oils having a viscosity ranging from 50,000 mPa.s to 1 million mPa.s at 25° C., and rubbers having a higher viscosity which can exceed 50 million mPa.s at 25° C. These polymers essentially consist of diorganosiloxy units of the formula R$_2$SiO and are blocked at each end of their chain by a hydroxyl group; however, the presence of monoorganosiloxy units of the formula RSiO$_{1.5}$ and/or siloxy units of the formula SiO$_2$ is not excluded in a proportion of at most 2%, relative to the number of diorganosiloxy units.

The symbols R have the meaning set forth above, namely, they represent alkyl and haloalkyl radicals having from 1 to 8 carbon atoms, such as methyl, ethyl, propyl, isopropyl, butyl, pentyl, hexyl, 2-ethylhexyl, octyl, 3,3,3-trifluoropropyl, 4,4,4-trifluorobutyl and 4,4,4,3,3-pentafluorobutyl radicals, cycloalkyl and halogenocycloalkyl radicals having from 4 to 8 carbon atoms, such as cyclopentyl, cyclohexyl, methylcyclohexyl, 2,3-difluorocyclobutyl and 3,4-difluoro-5-methylcycloheptyl radicals, alkenyl radicals having from 2 to 4 carbon atoms, such as vinyl, allyl and but-2-enyl radicals, aryl and haloaryl radicals having from 6 to 8 carbon atoms, such as phenyl, tolyl, xylyl, chlorophenyl, dichlorophenyl and trichlorophenyl radicals, and cyanoalkyl radicals having from 3 to 4 carbon atoms, such as β-cyanoethyl and γ-cyanopropyl radicals, The units of the formulae are exemplary (CH$_3$O$_2$SiO, CH$_3$(CH$_2$=CH)SiO, CH$_3$(C$_6$H$_5$)SiO, (C$_6$H$_5$)$_2$SiO, CF$_3$CH$_2$CH$_2$(CH$_3$)SiO, NC-CH$_2$CH$_2$(CH$_3$)SiO, NC-CH(CH$_3$)CH$_2$(CH$_2$=CH)SiO, NC-CH$_2$CH$_2$(C$_6$H$_5$) of the units represented by the formula R$_2$SiO.

The polymers (A) are readily commercially available from the several silicone manufacturers; furthermore, same can easily be manufactured utilizing known techniques. One of the commonest techniques consists, in a first stage, of polymerizing diorganocyclopolysiloxanes with the aid of catalytic amounts of alkaline or acid agents, and then in treating the polymers with calculated amounts of water (U.S. Pat. Nos. 2,857,350, 3,733,891 and 2,985,545 such added amount of water, which is increased, the lower the viscosity of the polymers sought to be prepared, can be totally or partially replaced by α,ω-dihydroxydiorganopolysiloxane oils having a low viscosity ranging, for example, from 5 to 200 mPa.s at 25° C. and having a high content in hydroxyl radicals In a second stage, the polymers are isolated by removing, at a temperature which is generally above 100° C. and under a pressure which is preferably below atmospheric pressure, the diorganocyclopolysiloxanes which are present when the reaction reaches equilibrium, and also the other polymers, of low molecular weight, which are formed during this reaction. Before distilling the volatile products, it is recommended to neutralize the alkaline or acid agents employed as polymerization catalysts.

The fillers (B) are incorporated in an amount of from about 5 to 200 parts by weight, preferably 10 to 150 parts, per 100 parts of the α, ω-dihydroxydiorganopolysiloxane polymers (A).

These fillers can be incorporated in the form of very finely divided inorganic products having a mean particle diameter of less than 0.1 micron. Such fillers include pyrogenic silicas, precipitation silicas, pyrogenic titanium oxide and aluminium oxide, and carbon blacks.

Same can also be incorporated in the form of more coarsely divided inorganic and/or organic products having a mean particle diameter of more than 0.1 micron; these particular fillers include ground quartz, diatomaceous silicas, calcium carbonate, calcined clay, titanium oxide of rutile type, the oxides of iron, zinc, chromium, zirconium and magnesium, the various forms of alumina (hydrated or non-hydrated), boron nitride, lithopone, barium metaborate, powdered cork, wood sawdust, phthalocyanines, inorganic and organic fibers, and organic polymers (polytetrafluoroethylene, polyethylene, polypropylene, polystyrene and polyvinyl chloride).

These fillers, and more especially the fillers of inorganic origin, can be surface modified by treatment with the various organosilicon compounds typically employed for such purpose. Thus, these organosilicon compounds can be organochlorosilanes, diorganocyclopolysiloxanes, hexaorganodisiloxanes, hexaorganodisilazanes or diorganocyclopolysilazanes (U.S. Pat. Nos. 3,036,985, 3,015,645 and 2,938,009 and British Patent No. 1,024,234). In the majority of cases, the treated fillers contain from 3 to 30% of their weight of organosilicon compounds.

The purpose of introducing the fillers is to impart good mechanical characteristics to the elastomers which result upon curing or hardening of the compositions according to the invention. It is envisaged to introduce a single kind of filler, or mixtures of several different types.

Inorganic and/or organic pigments, and also additives for improving the heat resistance of the elastomers (salts and oxides of rare earths, such as ceric oxides and hydroxides) and/or the flame resistance of the elastomers, can be used in combination with these fillers. Organic halogen derivatives, organic phosphorus derivatives, and platinum derivatives, such as chloroplatinic acid (and the products resulting from reaction thereof with alkanols or ethers) and platinous chloride/olefin complexes, are exemplary of the additives for improving flame resistance. These pigments and additives together represent at most 20% of the weight of the fillers.

The polyalkoxylated organosilanes (C) are incorporated in an amount of from about 2 to 20 parts by weight, preferably 3 to 15 parts, per 100 parts of the α, ω-dihydroxydiorganopolysiloxane polymers (A).

Such organosilanes correspond to the abovementioned formula:

As the R' only represents a methyl, vinyl, allyl, methallyl or phenyl radical and the symbols p and x only represent the numbers zero and one, the alkoxylated silanes (C) circumscribe a very limited group, including the silanes of the formulae: $Si(OCH_3)_4$, $Si(OCH_2CH_2OCH_3)_4$, $CH_3Si(OCH_3)_3$, $CH_3Si(OCH_2CH_2OCH_3)_3$, $CH_2=CHSi(OCH_3)_3$, $CH_2=CHSi(OCH_2CH_2OCH_3)_3$, $CH_2=CH-CH_2Si(OCH_3)_3$, $CH_2=CH-CH_2Si(OCH_2CH_2OCH_3)_3$, $CH_2=C(CH_3)CH_2Si(OCH_3)_3$, $CH_2=C(CH_3)CH_2Si(OCH_2CH_2OCH_3)_3$, $C_6H_5Si(OCH_3)_3$ and $C_6H_5Si(OCH_2CH_2OCH_3)_3$. Among such silanes, those of the formulae $Si(OCH_3)_4$, $Si(OCH_2CH_2OCH_3)_4$, $CH_2=CHSi(OCH_3)_3$, $CH_2=CHSi(OCH_2CH_2OCH_3)_3$, $C_6H_5Si(OCH_3)_3$, $C_6H_5Si(OCH_2CH_2OCH_3)_3$ are preferred.

Alkoxylated silanes such as those of the formulae $Si(OC_2H_5)_4$, $Si(O\,n-C_3H_7)_4$, $CH_3Si(OC_2H_5)_3$, $C_6H_5Si(OC_2H_5)_3$, although similar to the silanes (C), and typically employed in compositions which can be vulcanized under "cold" conditions, are not suitable for purposes hereof; some give rise to compositions which are poorly stable upon storage (they are difficult to extrude) and/or which harden slowly in the open atmosphere, for example, over a period of time of more than 4 days.

The silanes (C) are compounds which are widely utilized in the organosilicon industry; they are generally prepared by reacting the alcohol $H(OCH_2CH_2)pOCH_3$ with the chlorosilanes $R'_xSiCl_{4-x}$ in the presence of an HCl acceptor, such as tertiary amine.

The amino compounds (D) are incorporated in an amount of from about 0.5 to 15 parts by weight, preferably 1 to 12 parts, per 100 parts of the α, ω-dihydroxydiorganopolysiloxane polymers (A).

These amino compounds are selected from among the primary and secondary organic amines and the aminoorganosilanes.

The organic amines must possess a $pK_b$ of less than 5, preferably less than 4.5, measured in water, and a boiling point of at least 60° C., preferably at least 75° C., at atmospheric pressure.

These amines can be aliphatic, cycloaliphatic, heterocyclic or arylaliphatic.

The following are illustrative of suitable aliphatic amines:

Amines corresponding to the general formula $(Y)_sNH_{3-s}$, in which the symbol Y represents an alkyl group having from 4 to 25 carbon atoms when the symbol s represents one, and an alkyl group having from 1 to 25 carbon atoms when the symbol s represents 2; in the second case, the sum of the carbon atoms in the two radicals Y ranges from 5 to 30. The following amines are exemplary: n-butylamine, amylamine, the amines of the formulae:

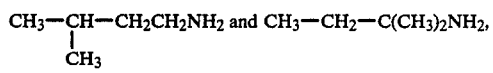

n-decylamine, laurylamine, hexadecylamine, n-octylamine, di-(isopropyl)-amine, di-(n-butyl)-amine and di-(isobutyl)-amine.

Amines corresponding to the general formula $M(NHQ)_tNHM$, in which the symbols M, which are identical or different, represent hydrogen atoms or alkyl radicals having from 1 to 10 carbon atoms, the symbol t represents one, two or three and the symbols Q (which can be identical or different, if the symbol t represents two or three) represent alkylene radicals which have from 1 to 25 carbon atoms and which are unsubstituted or substituted by one or more $NH_2$ radicals; the following amines are exemplary: ethylenediamine, propylenediamine, hexamethylenediamine and the polyamines of the formulae:

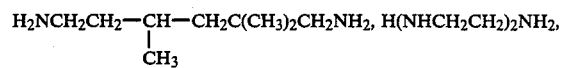

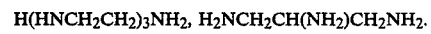

Cyclopenylamine, cyclohexylamine and the amines of the formulae:

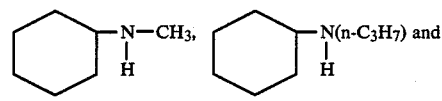

are exemplary of the cycloaliphatic amines.

Piperidine, pyrrolidine, piperazine and the amines of the formulae:

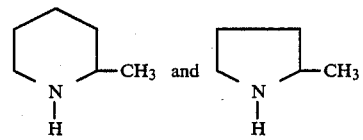

are exemplary of the heterocyclic amines.

Benzylamine and phenylethylamine are exemplary of the arylaliphatic amines.

All of the foregoing organic amines, and also processes for their preparation, are known to the art; furthermore, a great number of same are even commercially available.

The aminoorganosilanes (D) correspond to the abovementioned general formula:

$Y'NH(G'X)_yGSi[(OCH_2CH_2)_pOR'']_{3-m}Y''_m.$

The definitions of the various symbols G, G', X, Y', Y'', R'', y, p and m, and also the definitions of G'', R''' and k present in the group of the formula $(G''NH)_kR'''$, represented by Y', are as set forth hereinabove. In particular, the symbols G, G' and G'' represent linear or branched chain alkylene radicals respectively having from 1 to 5 carbon atoms, from 2 to 5 carbon atoms and from 2 to 6 carbon atoms.

Considering the number of carbon atoms defined above, these alkylene radicals can be selected from among those of the formulae: $-CH_2-$, $-CH_2-CH_2-$, $-(CH_2)_3$, $-CH_2-(CH-CH_3)-$, $-(CH_2)_4$, $-CH_2-CH-(CH_3)-CH_2-$, $-(CH_2)_5$, $-(CH_2)_6$, $$-CH_2-CH-CH_2-CH_2,$$
$$\quad\quad\quad |$$
$$\quad\quad\quad CH_3$$

$-CH_2-CH_2-CH-(CH_3)-CH_2-CH-_2.$

The aminoorganosilanes can be divided into two groups, namely, those corresponding to the formula $Y'NH(G'X)_yGSi[(OCH_2CH_2)_pOR'']_{3-m}Y''_m.$ derived from the general formula in which y represents zero, and those corresponding to the formula $Y'NH(G'X)_yGSi[(OCH_2CH_2)_pOR'']_{3-m}Y''_m.$ derived from the general formula in which y represents one.

Specific examples of the organoaminosilanes of the first group are those of the formulae:

(d) $H_2N(CH_2)_3Si(OCH_2CH_2OCH_3)_3$, $H_2N(CH_2)_3Si(OCH_3)_3$, $H_2N(CH_2)_3Si(OC_2H_5)_3$, $H_2N(CH_2)_4Si(OCH_3)_3$, $H_2NCH_2CH(CH_3)CH_2CH_2SiCH_3(OCH_3)_2$, $H_2NCH_2Si(CH_3)_3$, $HN(n-C_4H_9)CH_2Si(CH_3)_3$.

The preparation of these silanes is described in U.S. Pat. Nos. 2,754,311, 2,832,754 and 2,930,809 and in the article by L. H. Sommer and J. Rockett, published in *J. Amer. Chem. Soc.*, 73, 5,130–5, 134 (1951).

(2d) $H_2N(CH_2)_2NH(CH_2)_3Si(OCH_3)_3$, $H_2N(CH_2)_2NH(CH_2)_3Si(OCH_2CH_2OCH_3)_3$, $CH_3NH(CH_2)_2NH(CH_2)_3Si(OCH_3)_3$, $H(NHCH_2CH_2)_2NH(CH_2)_3Si(OCH_3)_3$, $H_2N(CH_2)_2NH(CH_2)_3Si(CH_3)_3$, $$H_2N(CH_2)_2NH(CH_2)_3SiCH=CH_2$$
$$\quad\quad\quad\quad\quad\quad\quad\quad\quad |$$
$$\quad\quad\quad\quad\quad\quad\quad\quad\quad (OCH_3)_2$$

The preparation of these particular silanes is described in U.S. Pat. No. 2,971,864 and in the article by S. F. Thames and L. H. Edwards, *J. Chem. Soc.*, 2,339 (1968).

Specific examples of the organoaminosilanes of the second group are those of the formulae:

(d') $H_2N(CH_2)_3O(CH_2)_3Si(OCH_2CH_2OCH_3)_3$, $H_2N(CH_2)_3O(CH_2)_3Si(OCH_3)_3$, $C_2H_5NH(CH_2)_3O(CH_2)_3Si(OCH_3)_3$, $H_2N-CH_2-CH(CH_3-CH_2O(CH_2)_3SiC_6H_5(OCH_3)_2$, $H_2N-CH_2CH_2NH(CH_2)_3O(CH_2)_3Si(OCH_3)_3$

The preparation of these silanes is described in U.S. Pat. Nos. 3,341,563, 3,551,375 and 3,598,853.

(2') $H_2N(CH_2)_2S(CH_2)_3Si(OCH_2CH_2OCH_3)_3$, $H_2N(CH_2)_2S(CH_2)_3Si(OCH_3)_3$, $H(NHCH_2CH_2)_2S(CH_2)_3SiCH_3(OCH_3)_2$

The preparation of these silanes is described in U.S. Pat. No. 3,488,373.

The hardening or curing catalysts (E) are incorporated in an amount of from about 0.005 to 3 parts by weight, preferably 0.01 to 1.5 parts, per 100 parts of $\alpha$, $\omega$-dihydroxydiorganopolysiloxane polymers (A). Such catalysts are selected from among:

(e) Iron chelates, such as iron acetylacetonate, tin, iron and lead salts of carboxylic acids, such as the 2-ethylhexanoate, the stearate, the oleate and the naphthenate of tin, lead and iron.

(2e) Organotin salts of carboxylic acids, such as dibutyltin diacetate or dilaurate, dimethyltin di-(2-ethylhexanoate), dibutyltin diversatate, dioctyltin succinate and dioctyltin maleate.

(3e) The products resulting from the reaction of the organotin salts described under (2e) with titanic acid esters, such as ethyl, n-propyl, isopropyl, n-butyl, 2-ethylhexyl and n-octyl titanate.

These products are characterized by Ti-O-Sn bonds; their preparation is described in U.S. Pat. No. 3,409,573 and British patent No. 928,496.

(4e) The products resulting from the reaction of diorganotin dichlorides with alkyl esters of thioglycolic acid. These products correspond to the formula $T_2Sn(S-CH_2COOT)_2$, in which the symbols T, which are identical or different, represent alkyl radicals having from 3 to 20 carbon atoms.

Specific examples of the aforesaid products are those of the formulae:
$(n-C_4H_9)_2Sn(S-CH_2COO\ iso-C_8H_{17})_2$
$(n-C_8H_{17})_2Sn(S-CH_2COO\ iso-C_8H_{17})_2.$ The preparation of such products is described, in particular, in French patent Nos. 1,477,892 and 1,488,631 and in Canadian patent No. 846,201.

In addition to the constituents A, B, C, D and E, additives based on organopolysiloxane polymers can also be incorporated; same influence the physical characteristics of the compositions according to the invention and/or the mechanical properties of the elastomers obtained by hardening these compositions.

Among such additives, the following are exemplary preferred embodiments:

(1f) $\alpha$, $\omega$-Bis-(triorganosiloxy)-diorganopolysiloxane and/or $\alpha$-(hydroxy)-$\omega$-(triorganosiloxy)-diorganopolysiloxane polymers having a viscosity of at least 10 mPa.s at 25° C. and essentially consisting of diorganosiloxy units and of at most 1% of monoorganosiloxy and/or siloxy units, the organic radicals bonded to the silicon atoms being selected from among methyl, vinyl and phenyl radicals and at least 60% of these organic radicals being methyl radicals. The viscosity of these polymers, in mPa.s at 25° C., can be up to several tens of millions; the polymers therefore include oils having a fluid to viscous appearance and soft to hard gums. They are prepared in accordance with the usual techniques which are more precisely described in U.S. Pat. Nos. 2,469,888, 2,469,890, 2,588,365, 2,739,952 and 3,294,145 $\alpha$, $\omega$-Bis -(trimethylsiloxy)-dimethylpolysiloxane oils having a viscosity ranging from 10 mPa.s to 1,000 mPa.s at 25° C. are more preferably employed. These polymers are incorporated in an amount of at most 150 parts by weight, preferably 5 to 120 parts, per 100 parts of $\alpha,\omega$-dihydroxydiorganopolysiloxane oils (A).

(2f) Liquid, branched methylpolysiloxane polymers having from 1.6 to 1.9 methyl radicals per silicon atom and consisting of a combination of units of the formulae: $(CH_3)_3SiO_{0.5}$, $(CH_3)_2SiO$ and $CH_3SiO_{1.5}$; the polymers contain from 0.2 to 10% of hydroxyl groups. Same can be obtained by hydrolyzing the corresponding chlorosilanes as described in U.S. Pat. No. 3,382,205. These polymers can be incorporated in an amount of at most 70 parts by weight, preferably 3 to 50 parts, per 100 parts of $\alpha,\omega$-dihydroxydiorganopolysiloxane polymers (A).

(3f) Diorganopolysiloxane oils blocked by hydroxyl groups and/or lower alkoxy groups having from 1 to 4 carbon atoms, and having a low viscosity which is generally within the range 2 mPa.s to 4,000 mPa.s at 25° C. (if such oils are blocked solely by hydroxyl groups, their viscosity is less than 500 mPa.s at 25° C.); as above, the organic radicals bonded to the silicon atoms in these oils are selected from among methyl, vinyl and phenyl radicals, at least 40% of these radicals being methyl radicals.

Methoxy, ethoxy, isopropoxy, propoxy, butoxy, isobutoxy and tert.-butoxy groups are representative of the chain-terminating lower alkoxy groups. The amount or content of hydroxyl and/or alkoxy groups generally ranges from 0.5 to 20%. These oils are prepared in accordance with the usual techniques which are more precisely described in U.S. Pat. Nos. 2,415,389, 2,607,792, 2,909,540, 3,046,293 and 3,046,294. Same can be incorporated in an amount of at most 50 parts, preferably 2 to 40 parts, per 100 parts of the $\alpha,\omega$-dihydroxydiorganopolysiloxane polymers (A).

(4f) hydroxylated organosilicon compounds selected from among the compounds corresponding to the general formula $Z'SiZ_2(OSiZ_2)_wOH$, which are solid at ambient temperature. In this formula, the symbols Z, which are identical or different, represent methyl, ethyl, propyl, vinyl or phenyl radicals, the symbol $Z'$ represents a hydroxyl radical or Z and the symbol w represents zero, 1 or 2.

Specific examples of the aforesaid compounds are diphenylsilanediol, methylphenylsilanediol, dimethylphenylsilanol, 1,1,3,3,-tetramethyldisiloxanediol, 1,3-dimethyldiphenylsiloxanediol, 1,3-dimethyl-1,3,diethyl-disiloxanediol and 1,1,5,5-tetramethyl-3,3-diphenyl-trisiloxanediol. Same can be incorporated in an amount of at most 30 parts by weight, preferably 0.5 to 20 parts, per 100 parts of $\alpha,\omega$-wdihydroxydiorganopolysiloxane polymers (A).

The $\alpha,\omega$-bis-(triorganosiloxy)-diorganopolysiloxane and/or $\alpha$-(hydroxy)-$\omega$-(triorganosiloxy)-diorganopolysiloxane polymers described under (1f) can be totally or partially replaced by organic compounds which are inert to the constituents A, B, C, D and E and which are miscible at least with the $\alpha,\omega$-dihydroxydiorganopolysiloxane polymers (A). Specific examples of these organic compounds are the polyalkylbenzenes obtained by alkylating benzene with longchain olefins, in particular with the olefins, containing 12 carbon atoms, which result from the polymerization of propylene.

To prepare the compositions according to the invention, it is recommended to utilize equipment which permits both the intimate mixing, in the absence of moisture, of the constituents A, B, C, D and E and also, if appropriate, of the abovementioned adjuvants and additives, and the discharge or removal of the volatile materials present (water and low molecular weight polymers).

All of these ingredients can be introduced in a preferential order. However, in order to rapidly obtain very homogeneous compositions and to avoid abrupt thickening of these compositions, it is preferred to proceed in two steps.

In a first step, the $\alpha,\omega$-dihydroxydiorganopolysiloxane polymers (A), the possible adjuvants and/or additives and the fillers (B) are introduced and the entire mass is malaxated at a temperature which is preferably above 70° C. and can exceed 150° C., under a pressure which is preferably below atmospheric pressure, for a sufficient period of time (for example, ranging from 30 minutes to 5 hours) to remove the volatile products. The pastes thus obtained are homogeneous, anhydrous and stable on storage.

In a second step, the alkoxylated organosilanes (C), the amino compounds (D) and the hardening catalysts (E) are added to these pastes, in the absence of moisture and preferably at atmospheric pressure. The mixtures are malaxated at a temperature on the order of 20° to 100° C. for the period of time required to obtain homogeneous compositions. A period of a few minutes (for example, from 1 to 30 minutes) is typically suitable.

According to another embodiment of the invention, it is possible for the hardening catalysts (E) not to be added until after the formation of homogeneous mixtures resulting from the malaxation of the pastes with the alkoxylated organosilanes (C) and the amino compounds (D). During the preparation of these mixtures, it is possible to remove the alcohols originating from the reaction of the hydroxyl radicals of the $\alpha,\omega$-dihydroxydiorganopolysiloxane polymers (A) at least with the alkoxy radicals of the organosilanes (C); in this case, the mixtures must be heated at about 50° to 120° C. for a period of 30 minutes to 3 hours.

The compositions according to the invention are stable on storage in the absence of water and harden, at or above ambient temperature, in the presence of moisture. The hardening (or crosslinking) takes place from the outside to the inside of the bulk of the compositions. A skin is initially formed on the surface and the crosslinking then continues in bulk. Complete formation of the skin (the surface is no longer tacky to the touch) requires a period of time of 3 to 45 minutes and hardening in bulk (making it possible to handle the elastomers formed) requires a period of 5 to 60 hours. These compositions exhibit the additional advantage of being very easy to use, and, after a storage period of one year, they still extrude satisfactorily.

Although they can be shaped, these compositions can be non-running on vertical supports. Furthermore, once they have hardened or cured to provide elastomers, they can adhere to any substrate without the prior deposition of anchoring agents, provided, however, that amino compounds (D), selected from among the aminoorganosilanes having at least two alkoxy groups $-(OCH_2CH_2)_pOR''$ bonded to the silicon atoms, the symbols $R''$ and p having the meaning indicated above, are used during the manufacture of such compositions.

The compositions can be employed for multiple applications, such as adhesive jointing or grouting in the building industry, the adhesive bonding of the most diverse materials (metals, plastics, natural and synthetic rubbers, wood, cardboard, glazed earthenware, brick, glass, stone, concrete and masonry elements), the coating of woven or non-woven products comprised of glass fibers, organic fibers or synthetic fibers, the covering or coating of sheets of metal or of a plastic or cellulosic material, the insulation of electrical conductors, the coating of electronic circuits and the preparation of molds used for the manufacture of articles from synthetic resins or foams.

For certain applications, such as the impregnation of woven or non-woven shaped articles, it is advantageous, and sometimes even necessary, to disperse the compositions of the invention in inert organic diluents, such as toluene, xylene, heptane, white spirit, cyclohexane, methylcyclohexane, trichloroethylene, tetrachloroethylene, ethyl acetate or butyl acetate. The concentration of the compositions in these dispersions is arbitrary; it is selected as a function of the amount of liquids absorbed by the materials to be treated, and as a function of the amount of compositions to be deposited in order to obtain the desired effects, for example, good water repellency or good insulating properties.

In order to further illustrate the present invention and the advantages thereof, the following specific examples are given, with all parts and percentages being by weight, it being understood that same are intended only as illustrative and in nowise limitative.

EXAMPLE 1

70 parts of an $\alpha,\omega$-dihydroxydimethylpolysiloxane oil having a viscosity of 50,000 mPa.s at 25° C., 40 parts of an $\alpha,\omega$-bis-(trimethylsiloxy)-dimethylpolysiloxane oil having a viscosity of 20 mPa.s at 25° C., 3 parts of diphenylsilanediol, 15 parts of a pyrogenic silica having a specific surface area of 200 m$^2$/g, and 45 parts of calcium carbonate having a mean particle diameter of 5 microns were successively introduced into a malaxator.

The contents of the malaxator were triturated for 2 hours at a temperature of 120° C. and under a pressure of 4,000 Pa. This resulted in the formation of an anhydrous, homogeneous paste K$_1$ (171 parts).

The paste was permitted to cool to about 60° C. and the following ingredients were incorporated therein at this temperature: 7 parts of the silane of the formula CH$_2$=CHSi(OCH$_2$CH$_2$OCH$_3$)$_3$, 4 parts of the silane of the formula H$_2$NCH$_2$CH$_2$NH(CH$_2$)$_3$Si(OCH$_3$)$_3$ and 0.1 part of a tin salt obtained by heating, at 110° C. for 3 hours, a mixture consisting of 100 parts of dibutyltin dilaurate and 27 parts of butyl titanate. This combination of the two silanes and the tin salt defines a cross-linking system K$_2$.

The mixture was then malaxated for 5 minutes at 60° C. and this resulted in the formation of a homogeneous composition P$_1$ which did not flow in the vertical position; such composition was stored in a sealed container which was impervious to moisture.

(a) One portion of this composition P$_1$ was spread, in the open atmosphere (temperature 20° C., relative humidity 50%), as a 2 mm thick layer, onto a polyethylene plate which had first been pre-coated with a commercial detergent.

After an exposure time of 30 minutes, the applied layer was non-tacky to the touch, and, after 24 hours, it had been converted into a rubbery film. When such film was seven (7) days old, it possessed the following mechanical properties:

Shore A hardness (in accordance with French Standard Specification T 51,109) = 20.

Tensile strength (in accordance with French Standard Specification T 46,002) = 1.5 MPa.

Elongation at break (in accordance with French Standard Specification T 46,002) = 600%.

Tear strength (in accordance with French Standard Specification T 46,007) = 50 N/cm.

Elongation at tear (in accordance with French Standard Specification T 46,007) = 250%.

(b) Another portion of the composition P$_1$ was utilized to manufacture test-pieces in accordance with ASA Standard Specification 116-1-1960, the method of manufacture of each test-piece being as follows:

Two square plates, having sides 50 mm in length, were placed face-to-face and 12 mm apart, the same consisting of that material, the adhesion to which of the cured elastomeric composition is to be measured. The interspace created between the two plates was then totally blocked with wooden wedges, except for the central portion of such interspace, so as to define a cavity having the dimensions 50×12×12 mm and extending from one edge of the plates to the other. This cavity was filled with the composition, the entire assembly being maintained for 28 days at ambient temperature and the wedges were then removed in order to release the test-piece, or specimen. Such specimen thus comprised two plates of the same material, which were attached to one another, along one of their median lines, by a parallelepipedic bar of elastomer.

The test-pieces manufactured in this fashion were divided into three batches of equal size and the test-pieces making up each batch differed from one another in the nature of the material forming the plates themselves, this material being selected from among glass, aluminum, concrete, fir and polyvinyl chloride (PVC).

(i) First batch: the tensile strength (TS) of the test-pieces, and also the corresponding elongation (E/B), were measured using a tensile tester actuated in accordance with the recommendations of ASA Standard Specification 116-1-1960. The results are summarized in Table 1 below.

TABLE 1

| Mechanical Properties | Materials | | | | |
|---|---|---|---|---|---|
| | GLASS | ALUMINUM | CONCRETE | FIR | PVC |
| TS in MPa | 0.6 | 0.65 | 0.59 | 0.68 | 0.66 |
| E/B in % | 490 | 450 | 410 | 380 | 430 |

All of the breaks were cohesive and same occurred in the bulk of the bar of elastomer; thus, there were no adhesive breaks characterized by detachment of the bar at the level of its zones of contact with the plates.

(ii) Second batch: the test-pieces were placed under tension by subjecting same to an elongation of 150% with the aid of wedges, and the condition of the test-pieces was examined 24 hours after application of such tension; it was found that all of the test-pieces passed the test and that there were neither any cohesive or adhesive breaks.

(iii) Third batch: the test-pieces were immersed in water at 25° C. for 96 hours; same were then placed under tension by being subjected to an elongation of 150%, and the condition of the test-pieces was examined 24 hours after the application oftension; it was again found that all of the test-pieces passed the test.

(c) A third portion of the composition P$_1$ was introduced into aluminum tubes, each having a capacity of 100 cm$^3$; such filled tubes were then closed and maintained for 48 hours in an oven heated to 100° C.

After cooling the containers to about 20° C., their contents were spread, as a 2 mm thick layer, on a polyethylene plate which had first been pre-coated with a commercial detergent; it was found that the deposited layer behaved in essentially the same manner as the layer described under (a), with a touch-dry time of 30 minutes and a crosslinking time of 24 hours. When it was seven (7) days old, the rubbery film formed had the following properties:
Shore A hardness = 18
Tensile strength = 1.1 MPa
Elongation at break = 550%
Tear Strength = 45 N/cm
Elongation at tear = 200%

(d) A fourth portion of composition $P_1$ was taken after a storage period of 8 months in a container impervious to moisture.

This portion was tested as described under (a); the touch-dry time of the deposited layer was found to be 25 minutes and the crosslinking time of this layer was found to be 20 hours.

The mechanical properties of the resulting film were as follows:
Shore A hardness = 20
Tensile strength = 1.4 MPa
Elongation at break = 500%
Tear strength = 55 N/cm
Elongation at tear = 180%

(e) By way of comparison, 5 compositions $P'_1$, $P''_1$, $P'''_1$, $P^4_1$ and $P^5_1$ were prepared in accordance with the procedure employed for preparing the composition $P_1$, except that the constituents of the crosslinking system $K_2$ were modified in the following manner:

(i) Composition $P'_1$: the tin salt was not employed.

(ii) Composition $P''_1$: the silane $H_2N(CH_2)_2NH(CH_2)_3Si(OCH_3)$ was not employed; however, in order to retain the same level of alkoxy groups, bonded to the silicon atoms, as in the composition $P_1$, 12.2 parts of the silane $CH_2=CHSi(OCH_2CH_2OCH_3)_3$ were introduced instead of 7 parts.

(iii) Composition $P'''_1$: the silane $CH_2=CHSi(OCH_2CH_2OCH_3)_3$ was not employed; however, in order to have the same level of alkoxy groups, bonded to the silicon atoms, as in the composition $P_1$, 9.6 parts of the silane $H_2N(CH_2)_2NH(CH_2)_3Si(OCH_3)_3$ were introduced instead of 4 parts.

(iv) Composition $P^4_1$: the 7 parts of the silane $CH_2=CHSi(OCH_2CH_2OCH_2)_3$ were replaced by 5 parts of the silane $Si(OC_2H_5)_4$, and the 0.1 part of the tin salt was replaced by 0.02 part of the same salt (if 0.1 part of this salt be employed the composition becomes very thick and can no longer be extruded).

(v) Composition $P^5_1$: the 7 parts of the silane $CH_2=CHSi(OCH_2CH_2OCH_3)_3$ were replaced by 4 parts of the silane $CH_3Si(OC_2H_5)_3$, and the 0.1 part of the tin salt was replaced by 0.02 part of the same salt (if 0.1 part of this salt be employed, the composition can no longer be extruded).

The aforesaid compositions were next examined in accordance with the tests utilized in connection with the composition $P_1$, and the following results were recorded: Composition $P'_1$: when exposed to the atmosphere in the form of a 2 mm thick layer, this composition crosslinked unsatisfactorily; thus, after an exposure time of seven (7) days, it still had not been converted into a film of elastomer which could be stripped.

Composition $P''_1$: this composition was not storage stable in a container impervious to moisture; it solidified after a storage time of 30 hours.

Composition $P'''_1$: when exposed to the atmosphere in the form of a 2 mm thick layer, this composition hardened in 48 hours; however, the stripped film did not have good mechanical properties; in particular, after aging for 14 days, it possessed a Shore A hardness of 5 and a tensile strength of 0.2 MPa.

Composition $P^4_1$: after a treatment in which it was enclosed in aluminum tubes and heated for 48 hours at 100° C., this composition did not harden further; when exposed to the atmosphere, the deposited layers remained constantly pasty.

Composition $P^5_1$: when heated as indicated above, for 48 hours at 100° C., this composition hardened unsatisfactorily on subsequent exposure to the atmosphere; it was necessary to wait for fifteen (15) days in order to obtain a film of elastomer which could be stripped.

EXAMPLE 2

Two compositions $P_2$ and $P_3$ were prepared by following the procedure employed for preparing the composition $P_1$ described in Example 1, except that the constituents of the crosslinking system $K_2$ were modified as follows:

Composition $P_2$: the 4 parts of the silane $H_2N(CH_2)_2NH(CH_2)_3Si(OCH_3)_3$ were replaced by 5.5 parts of the silane $H_2N(CH_2)_2NH(CH_2)_3Si(OCH_2CH_2OCH_3)_3$.

Composition $P_3$: the 7 parts of the silane $CH_2=CHSi(OCH_2CH_2OCH_3)_3$ were replaced by 8 parts of the silane $Si(OCH_2CH_2OCH_3)_4$, and 0.05 part of the tin salt was utilized instead of 0.1 part.

(a') One portion of each of these two compositions was spread, as a 2 mm thick layer, on a polyethylene plate in accordance with the process described under (a) of Example 1.

The touch-dry time and the hardening time of the deposited layers, and also the characteristics of the films of elastomers formed, when the films were seven (7) days old, were then recorded. The numerical results are summarized in Table 2 below:

TABLE 2

| Composition deposited | Characteristics | | |
|---|---|---|---|
| | Touch-dry time in minutes | Hardening time in hours | Shore A Hardness |
| $P_2$ | 25 | 24 | 15 |
| $P_3$ | 10 | 12 | 20 |

| Composition deposited | Characteristics | | | |
|---|---|---|---|---|
| | Tensile strength in MPa | Elongation at break in % | Tear strength in N/cm | Elongation at tear in % |
| $P_2$ | 1.1 | 700 | 40 | 350 |
| $P_3$ | 1.5 | 600 | 50 | 170 |

(b') Another portion of each of these two compositions was utilized to manufacture test-pieces in accordance with ASA Standard Specification 116-1-1960, each test-piece being manufactured in accordance with the process given under (b) of Example 1.

The test-piece were divided into three (3) batches of equal size and each batch was subjected to one of the tests also described under (b) of Example 1.

(i) First batch: the results relating to the measurement of the tensile strength (TS) and or the corresponding elongation (E/B) of the test-pieces are summarized in Table 3 below:

TABLE 3

| Mechanical properties | | Materials forming the plates of the test-pieces | | | | | |
|---|---|---|---|---|---|---|---|
| | | GLASS | ALUMINUM | CONCRETE | FIR | PVC | STEEL |
| P$_2$ | TS in MPa | 0.7 | 0.7 | 0.8 | 0.8 | 0.7 | 0.65 |
| | E/B in % | 550 | 520 | 400 | 450 | 500 | 600 |
| P$_3$ | TS in MPa | 0.6 | 0.5 | 0.6 | 0.5 | 0.55 | 0.5 |
| | E/B in % | 600 | 300 | 400 | 300 | 350 | 600 |

(ii) Second batch: the test-pieces were placed under tension by subjecting them to an elongation of 150%; these test-pieces were examined after aperiod of time of 24 hours and it was found that same passed the test; there were neither any cohesive or adhesive breaks.

(iii) Third batch: the test-pieces were immersed in water at 25° C. for 96 hours and were then placed under tension as above.

These test-pieces were examined after a period of time of 24 hours and it was found that they too passed the test.

(c') A third portion of each of the compositions P$_2$ and P$_3$ was treated in accordance with the process described under (c) of Example 1, namely, by introducing the compositions into aluminum tubes, closing the tubes and heating for 48 hours at 100° C.

After this accelerated ageing stage, the properties of the compositions were measured in accordance with the tests described above; it was found that the touch-dry time and hardening time were on the order of those included in Table (2), that the films of elastomer have essentially the same mechanical properties as those included in Table (2), and that the adhesion to ASA test-pieces had virtually the same values as those summarized in Table (3).

EXAMPLE 3

90 parts of α,ω-dihydroxydimethylpolysiloxane oil having a viscosity of 100,000 mPa.s at 25° C., 30 parts of a mixture of organic products having a viscosity of 90 mPa.s at 25° C. and consisting of a distillation cut of branched dodecylbenzene having a boiling range of 302°–385° C. at atmospheric pressure, 2 parts of an α,ω-dihydroxymethylphenylpolysiloxane oil having a viscosity of 350 mPa.s at 25° C., 12 parts of a pyrogenic silica having a specific surface area of 150 m$^2$/g, and 70 parts of calcium carbonate having a mean particle diameter of 5 microns were successively introduced into a malaxator.

The contents of the malaxator were triturated for 3 hours at a temperature of 100° C. and under a pressure of 5,000 Pa. The paste (202 parts) thus formed was permitted to cool to about 60° C. and the following were incorporated therein at this temperature: 5 parts of the silane of the formula C$_6$H$_5$Si(OCH$_3$)$_3$, 4.5 parts of the silane of the formula H$_2$N(CH$_2$)$_3$Si(OCH$_3$)$_3$ and 0.05 part of dibutyltin diacetate.

The entire mass was malaxated for 3 minutes at 60° C.

The resulting composition was stored in a closed container impervious to moisture.

One portion of this composition was spread, as a 2 mm thick layer, on a polyethylene plate in accordance with the process described under (a) of Example 1. The behavior of the deposited layer, and also the characteristics of the rubbery film formed, when same was seven (7) days old, were then noted.

The results were as follows:

Touch-dry time = 20 minutes
Hardening time = 18 hours
Shore A hardness = 25
Tensile strength in MPa = 1.3
Elongation at break in % = 500
Tear strength in N/cm = 50
Elongation at tear in % = 180

Another portion of this composition was heated at 100° C. for 48 hours in accordance with the process described under (c) of Example 1. After cooling to 25° C., the composition was spread, as a 2 mm thick layer, on a polyethylene plate and the behavior of the deposited layer, and also the mechanical properties of the film of elastomer formed, when same was seven (7) days old, were recorded.

The results were as follows:
Touch-dry time = 25 minutes
Hardening time = 20 hours
Shore A hardness = 27
Tensile strength in MPa = 1.1
Elongation at break in % = 550
Tear strength in N/cm = 45
Elongation at tear in % = 150

EXAMPLE 4

Three different compositions P$_4$, P$_5$ and P$_6$ were prepared by adding, to the paste K$_1$ (171 parts) prepared in Example 1, one of the crosslinking systems below:

Composition P$_4$: 6.4 parts of the silane of the formula Si(OCH$_3$)$_4$, 3 parts of the amine of the formula:

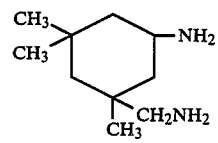

and 0.1 part of dibutyltin dilaurate.

The paste K$_1$, the silane Si(OCH$_3$)$_4$ and the amine were first heated in the malaxator for 2 hours at 100° C. at atmospheric pressure, During this heating, about 1.3 parts of methanol were collected.

The dibutyltin dilaurate was then added to the contents of the malaxator, cooled to about 50° C.

Composition P$_5$: 11 parts of the silane of the formula CH$_3$Si(OCH$_2$CH$_2$OCH$_3$)$_3$, 3 parts of n-octylamine of the formula CH$_3$(CH$_2$)$_7$NH$_2$ and 0.1 part of dibutyltin dilaurate.

In a first stage, the paste K$_1$, the silane and the amine were heated in the malaxator for 6 hours at 110° C. under a pressure of 5,000 Pa; about 5 parts of the alcohol CH$_3$OCH$_2$CH$_2$OH were evolved during this treatment. In a second step, the tin salt was introduced into the contents of the malaxator, cooled to about 50° C.

Composition P$_6$: 6 parts of the silane of the formula CH$_3$Si(OCH$_3$)$_3$, 4 parts of the diamine of the formula $H_2NCH_2CH_2CH(CH_3)CH_2C(CH_3)_2CH_2NH_2$ and 0.1 part of dibutyltin dilaurate.

In a first stage, the paste $K_1$, the silane and the amine were heated in the malaxator for 6 hours at about 80° C. at atmospheric pressure; about 2 parts of methanol were evolved during this treatment. In a second stage, the tin salt was introduced into the contents of the malaxator, cooled to about 45° C.

One portion of each of these three (3) compositions was spread, under ambient conditions, as a 2 mm layer, on a polyethylene plate in accordance with the process described under (a) of Example 1. The behavior of the deposited layers, and also the characteristics of the films formed, when the films were seven (7) days old, were then recorded. The numerical results are summarized in Table 4 below:

TABLE 4

| Composition | Characteristics | | | | |
|---|---|---|---|---|---|
| | Touch Dry time in minutes | Hardening Time in hours | Shore A Hardness | Tensile Strength in MPa | Elongation at break in % |
| $P_4$ | 16 | 36 | 15 | 1.3 | 470 |
| $P_5$ | 14 | 44 | 13 | 1.1 | 600 |
| $P_6$ | 15 | 50 | 14 | 1.2 | 550 |

Another portion of each of these 3 compositions was subjected to accelerated ageing by heating for 48 hours at 100° C. in accordance with the process described under (c) of Example 1.

It was found that the behavior of these aged compositions was essentially identical to the behavior of the above compositions which had not been subjected to heat treatment.

EXAMPLE 5

Three compositions $P_7$, $P_8$ and $P_9$ were prepared by adding, to the paste $K_1$ (171 parts) prepared in Example 1, one of the crosslinking systems below:

Composition $P_7$: 11 parts of the silane of the formula $Si(OCH_2CH_2OCH_3)_4$, 1 part of piperidine, 6 parts of the silane of the formula $H_2N(CH_2)_2NH(CH_2)_2NH(CH_2)_3Si(OCH_3)_3$ and 0.1 part of dibutyltin dilaurate.

The mixture consisting of the paste $K_1$ and of the above crosslinking system was malaxated for 10 minutes at 60° C.

Composition $P_8$: 7 parts of the silane of the formula $C_6H_5Si(OCH_2CH_2OCH_3)_3$, 2 parts of ethylenediamine, 4 parts of the sil of the formula $H_2N(CH_2)_3O(CH_2)_3Si(OCH_3)_3$ and 0.1 parts of dibutyltin diacetate.

In a first stage, the paste $K_1$, the two (2) silanes $C_6H_5Si(OCH_2CH_2OCH_3)_3$ and $H_2N(CH_2)_3O(CH_2)_3Si(OCH_3)_3$ and the ethylenediamine were heated in the malaxator at 60° C. for 2 hours, and in a second stage, the tin salt was introduced into the contents of the malaxator, cooled to about 50° C.

Composition $P_9$: 6 parts of the silane of the formula $CH_2=CHSi(OCH_3)_3$, 1.5 parts of the amine of the formula $CH_3(CH_2)_3NH_2$, 4 parts of the aminosilane of the formula $H_2N(CH_2)_2S(CH_2)_3Si(OCH_3)_3$ and 0.1 part of dibutyltin diacetate.

The mixture consisting of the paste $K_1$ and of the above crosslinking system was malaxated for 10 minutes at 60° C.

One portion of each of these three (3) compositions $P_7$, $P_8$ and $P_9$ was spread, under ambient conditions, as a 2 mm thick layer, in accordance with the process described under (a) of Example 1. The behavior of the deposited layers, and also the characteristics of the films formed, when the films were seven (7) days old, were then recorded. The numerical results are summarized in Table 5 below:

TABLE 5

| Composition | Characteristics | | | | |
|---|---|---|---|---|---|
| | Touch Dry time in minutes | Hardening Time in hours | Shore A Hardness | Tensile Strength in MPa | Elongation at break in % |
| $P_7$ | 12 | 16 | 19 | 1.5 | 550 |
| $P_8$ | 15 | 18 | 20 | 1.2 | 450 |
| $P_9$ | 16 | 20 | 18 | 1.3 | 500 |

Another portion of each of these three (3) compositions was utilized to manufacture test-pieces in accordance with ASA Standard Specification 116-1-1960. The process for the manufacture of each test-piece was the one described under (b) of Example 1; however, the material constituting the plates of the test-pieces was based solely on aluminum.

The results relating to the measurement of the tensile strength (TS) and of the elongation at break (E/B) of the test-pieces are summarized in Table 6 below:

TABLE 6

| Properties | Composition | | |
|---|---|---|---|
| | $P_7$ | $P_8$ | $P_9$ |
| TS in MPa | 0.7 | 0.6 | 0.55 |
| E/B in % | 250 | 200 | 230 |

All these breaks were cohesive.

Another portion of each of these three (3) compositions was subjected to accelerated ageing by heating at 100° C. for 48 hours in accordance with the process indicated under (c) of Example 1. The recorded behavior of these aged compositions was essentially identical to the behavior of the above compositions which had not been subjected to heat treatment.

EXAMPLE 6

100 parts of an α,ω-dihydroxymethylphenylpolysiloxane oil having a viscosity of 30,000 mPa.s at 25° C. and consisting of 94 mol % of $(CH_3)_2SiO$ units and 6 mol % of $(C_6H_4)_2SiO$ units, 15 parts of pyrogenic silica having a specific surface area of 300 m²/g and treated with octamethylcyclotetrasiloxane, and 5 parts of an α,ω-dimethoxymethylphenylpolysiloxane oil having a viscosity of 50 mPa.s at 25° C. and consisting of 70 mol % of $(CH_3)_2SiO$ units and 30 mol % of $(C_6H_5)_2SiO$ units were successively introduced into a malaxator.

The contents of the malaxator were mixed for 3 hours at a temperature of 110° C and under a pressure of 5,000 Pa. The resulting paste (119 parts) was permitted to cool to about 60° C and the following were incorporated therein: 7 parts of the silane of the formula $CH_2=CH-CH_2Si(OCH_2CH_2OCH_3)_3$, 4 parts of the silane of the formula $H_2N(CH_2)_3O(CH_2)_3Si(OCH_2CH_2OCH_3)_3$, and 0.1 part of the dibutyltin dilaurate.

The entire mass was malaxated for 3 minutes at 60° C. The resulting composition was divided into two (2) portions. One of the portions was spread, under ambient conditions, as a 2 mm thick layer, on a polyethylene plate in accordance with the process described under (a) of Example 1. The behavior of the deposited layer, and also the characteristics of the rubbery film formed, when same was seven (7) days old, were then noted. The results were as follows:
Touch-dry time = 30 minutes
Hardening time = 22 hours
Shore A hardness = 20
Tensile strength in MPa = 1.7
Elongation at break in % = 350

The other portion was heated at 100° C for 48 hours in accordance with the process described under (c) of Example 1. After cooling, this portion was also spread, also in the open atmosphere, as a 2 mm thick layer and the following numerical results were recorded:
Touch-dry time = 40 minutes
Hardening time = 25 hours
Shore A hardness = 18
Tensile strength in MPa = 1.3
Elongation at break in % = 250

EXAMPLE 7

100 parts of an α, ω-dihydroxymethylvinylpolysiloxane oil having a viscosity of 4,000 mPa.s at 25° C and consisting of 97 mol % of $(CH_3)_2SiO$ units and 3 mol % of $CH_3(CH_2=CH)SiO$ units, 20 parts specific surface area of 300 m²/g and treated with octamethylcyclotetrasiloxane, and 20 parts of ground quartz having a mean particle diameter of 5 microns were successively introduced into a malaxator. The contents of the malaxator were mixed for 3 hours at 110° C. and under a pressure of 4,500 Pa; the resulting paste (139.5 parts) was permitted to cool to about 50° C. and the following were incorporated therein: 10 parts of the silane of the formula $Si(OCH_2CH_2CH_3)_4$, 5 parts of the silane of the formula $H_2N(CH_2S(CH_2)_3Si(OCH_3)_3$ and 0.1 part of dibutyltin diacetate. The entire mass was malaxated for 5 minutes at 50° C. The resulting composition was then divided into two (2) portions.

One of the portions was spread, under ambient conditions, as a 2 mm thick layer in accordance with the process described under (a) of Example 1. The behavior of the deposited layer and the characteristics of the film formed, when same was seven (7) days old, were then noted. The results were as follows:
Touch-dry time = 8 minutes
Hardening time = 10 hours
Shore A hardness = 59
Tensile strength in MPa = 2.7
Elongation at break in % = 150

The other portion was heated for 48 hours at 100° C. in accordance with the process described under (c) of Example 1; after cooling, this portion was also spread, under ambient conditions, as 2 mm thick layer and the following numerical results were recorded:
Touch-dry time = 8 minutes
Hardening time = 12 hours
Shore A hardness = 62
Tensile strength in MPa = 3.2
Elongation at break in % = 120

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims. What is claimed is:

1. A curable, pasty, one-component storage stable organopolysiloxane composition of matter consisting essentially of an intimate, water-free admixture of:
   (i) 100 parts by weight of aω-dihydroxydiorganopolysiloxane polymer having a viscosity of at least 500 mPa.s at 25° C. and essentially consisting of diorganosiloxy units of he formula R₂SiO, in which the symbols R, which are identical or different, represent alkyl and haloalkyl radicals having from 1 to 8 carbon atoms, alkenyl radicals having from 2 to 4 carbon atoms, aryl and haloaryl radicals having from 6 to 8 carbon atoms or cyanoalkyl radcials having fro 3 to 4 carbon atoms, at least 50% of the total of such radicals being methyl radicals;
   (ii) 5 to 200 parts by weight of filler;
   (iii) 2 to 20 parts by weight of a polyalkoxylated organosilane having the structural formula:

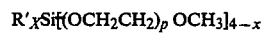

wherein R', is methyl, vinyl, allyl, methallyl or phenyl, and p and x are each zero or one;
   (iv) 0.5 to 115 parts by weight of an amine selected from the group consisting of primary and secondary organic amines having a PKb of less than 5 in an aqueous medium and having a boiling point of at least 60° C. at at atmospheric pressure, and the aminoorganosilanes having the structural formula:

in which the symbol R" represents a methyl or ethyl radical, the symbol G represents an alkylene radical having from 1 to 5 carbon atoms, the symbol X represents an oxygen or sulfur atom, the symbol G', represents an alkylene radical having from 2 to 5 carbon atoms, the symbol Y', represents a radical of the formula (G"NH)$_k$R''', in which the symbol G" represents an alkylene radical having from 2 to 6 carbon atoms, the symbol R''' represents a hydrogen atom or an alkyl radicla having from 1 to 4 carbon atoms and the symbol k represents zero, one, two or three, the symbol Y" represents a methyl vinyl or phenyl radical, the symbols p and y represent zero or one, with the proviso that, if p is one, R" can only be methyl, and the symbol m represents zero, on, two or three; and
   (v) 0.005 to 3 parts by weight of a curing catalyst selected from the group consisting of tin salts of carboxylic acids and organotin salts of carboxylic acids.

2. The composition of matter as defined by claim 1, wherein the component (i) R is selected from the group consisting of methyl, ethyl, propyl, isopropyl, butyl, pentyl, hexyl, 2-ethylhexyl, octyl, 3, 3, 3-trifluoropropyl, 4, 4, 4-trifluorobutyl, trifluorobutyl, 4, 4, 3, 3-pentafluorobutyl, cyclopentyl, cyclohexyl, methylcyclohexyl, 2,3-difluorocyclobutyl, 3,4-difluoro-5-methylcycloheptyl, vinyl, allyl, but-2-enyl, phenyl, tolyl, xylyl, chlorophenyl, dichlorophenyl, trichlorophenyl, β-cyanoethyl and Y-cyanopropyl.

3. The composition of matter as defined by claim 1, the filler component (ii) comprising particulates having a mean particle diameter of less than 0.1 micron and selected from the group consisting of pyrogenic silica, precipitation silica, pyrogenic titanium oxide, aluminum oxide and carbon black.

4. The composition of matter as defined by claim 1, the filler component (ii) comprising particulates having a mean particle diameter in excess of 0.1 micron and selected from the group consisting of ground quartz, diatomaceous silica, calcium carbonate, calcined clay, rutile titanium oxide, the oxides of iron, zinc, chromium, zirconium and magnesium, hydrated or non-hydrated alumina, boron nitride, lithopone, barium metaborate, powdered cork, wood sawdust, phthalocyanines, inorganic and organic fibers, and organic polymers.

5. the composition of matter as defined by claim 1, the polyalkoxylated organosilane (iii) being selected from the group consisting of $Si(OCH_3)_4$, $Si(OCH_2CH_2OCH_3)_4$, $CH_3Si(OCH_3)_3$, $CH_3Si(OCH_2CH_2OCH_3)_3$, $CH_2=CHSi(OCH_3)_3$, $CH_2=CHSi(OCH_2CH_2OCH_3)_3$, $CH_2=CH-CH_2Si(OCH_3)_3$, $CH_2=CH-CH_2Si(OCH_2CH_2OCH_3)_3$, $CH_2=C(CH_3)CH_2Si(OCH_3)_3$, $CH_2=C(CH_3)CH_2Si(OCH_2CH_2OCH_3)_3$, $C_6H_5Si(OCH_3)_3$ and $C_6H_5Si(OCH_2CH_2OCH_3)_3$.

6. The composition of matter as defined by claim 5, said polyalkoxylated organosilane (iii) being selected from the group consisting of $Si(OCH_3)_4$, $Si(OCH_2CH_2OCH_3)_4$, $CH_2=CHSi(OCH_3)_3$, $CH_2=CHSi(OCH_2CH_2OCH_3)_3$, $C_6H_5Si(OCH_3)_3$ and $C_6H_5Si(OCH_2CH_2OCH_3)_3$.

7. The composition of matter as defined by claims 1 the amine (iv) having the formula $(Y)_sNH_{3-s}$, wherein s is one or two, and Y is alkyl having from 4 to 25 carbons when s is one, and alkyl having from 1 to 25 carbon atoms when s is two, with the proviso that the total number of carbon atom in the Y's, when s is two, ranges from 5 to 30.

8. The composition of matter as defined by claim 7, wherein the amine (iv) is selected from the group consisting of n-butylamine, amylamine,

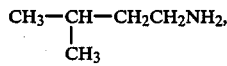

$CH_3-CH_2-C(CH_3)_2NH_2$ n-decylamine, laurylamine, hexadecylamine, n-octylamine, di-(isopropyl)-amine, di(n-butyl)-amine and di-(isobutyl)-amine.

9. The composition of matter as defined by claims 1, the amine (iv) having the formula $M(NHQ)_tNHM$, in which the symbols M, which are identical or different, represent hydrogen atoms or alkyl radicals having from 1 to 10 carbon atoms, the symbol t represents one, two or three and the symbols Q, which are identical or different when t is two or three, represent alkylene radicals or $-NH_2$ substituted alkylene radicals having from 1 to 25 carbon atoms.

10. The composition of matter as defined by claim 9, wherein the amine (iv) is selected from the group consisting of ethylenediamine, propylenediamine, hexamethylenediamine,

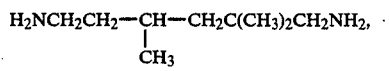

$H(NHCH_2CH_2)_2NH_2$, $H(HNCH_2CH_2)_3NH_2$ and $H_2NCH_2CH(NH_2)CH_2NH_2$.

11. The composition of matter as defined by claims 1, wherein the amine (iv) is selected from the group consisting of cyclopentylamine, cyclohexylamine,

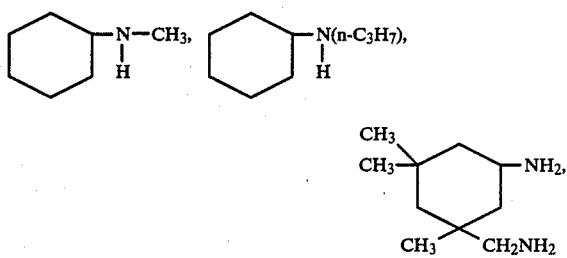

piperidine, pyrrolidine, piperazine,

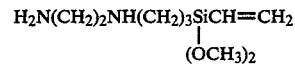

benzylamine and phenylethylamine.

12. The composition of matter as defined by claims 1, wherein the amine (iv) is selected from the group $H_2N(CH_2)_3Si(OCH_2CH_2OCH_3)_3$, $H_2N(CH_2)_3Si(OCH_3)_3$, $H_2N(CH_2)_3Si(OC_2H_5)_3$, $H_2N(CH_2)_4Si(OCH_3)_3$, $H_2NCH_2CH(CH_3)CH_2CH_2SiCH_3(OCH_3)_2$, $H_2NCH_2Si(CH_3)_3$, $HN(n-C_4H_9)CH_2Si(CH_3)_3$, $H_2N(CH_2)_2NH(CH_2)_3Si(OCH_3)_3$, $H_2N(CH_2)_2NH(CH_2)_3Si(OCH_2CH_2OCH_3)_3$, $CH_3NH(CH_2)_2NH(CH_2)_3Si(OCH_3)_3$, $H(NHCH_2CH_2)_2NH(CH_2)_3Si(OCH_3)_3$, $H_2N(CH_2)_2NH(CH_2)_3Si(CH_3)_3$, $$H_2N(CH_2)_2NH(CH_2)_3SiCH=CH_2$$
$$|$$
$$(OCH_3)_2$$

$H_2N(CH_2)_3O(CH_2)_3Si(OCH_2CH_2OCH_3)_3$, $H_2N(CH_2)_3O(CH_2)_3Si(OCH_3)_3$, $C_2H_5NH(CH_2)_3O(CH_2)_3Si(OCH_3)_3$, $H_2N-CH_2-CH(CH_3)CH_2O(CH_2)_3SiC_6H_5(OCH_3)_2$, $H_2N-CH_2CH_2NH(CH_2)_3O(CH_2)_3Si(OCH_3)_3$, $H_2N(CH_2)_2S(CH_2)_3Si(OCH_2CH_2OCH_3)_3$, $H_2N(CH_2)_2S(CH_2)_3Si(OCH_3)_3$, and $H(NHCH_2CH_2)_2S(CH_2)_3SiCH_3(OCH_3)_2$.

13. The composition of matter as defined by claim 1, further comprising up to 150 parts by weight per 100 parts of the polysiloxane (i) of an α,ω-bis-(triorganosiloxy)diorganopolysiloxane polymer having a viscosity of at least 10 mPa.s at 25° C., the organic radicals bonded to the silicon atoms being selected from the group consisting of methyl, vinyl and phenyl radicals and at least 60% of such radicals being methyl radicals.

14. The composition of matter as defined by claim 13, wherein the αω-bis-(triorganosiloxy)-diorganosiloxane is at least partially replaced by polyalkylbenzenes obtained by alkylating benzene with long chain olefins which result from the polymerization of propylene.

15. A process for the preparation of the composition of matter as defined by claim 1, comprising the intimate mixing, in the absence of moisture, of components (i) through (v), followed by the removal of volatile components.

* * * * *